United States Patent [19]

Reynolds et al.

[11] Patent Number: 4,543,843
[45] Date of Patent: Oct. 1, 1985

[54] REMOTE MASTER SHIFT CONTROL

[75] Inventors: Joseph D. Reynolds, Climax; Ernst H. Lauer, West Kalamazoo, both of Mich.

[73] Assignee: Eaton Corporation, Cleveland, Ohio

[21] Appl. No.: 580,399

[22] Filed: Feb. 15, 1984

[51] Int. Cl.⁴ .............................................. G05G 9/18
[52] U.S. Cl. .................................................. 74/473 R
[58] Field of Search ....................................... 74/473 R

[56] References Cited

U.S. PATENT DOCUMENTS

| | | | |
|---|---|---|---|
| 2,040,594 | 5/1936 | Bixby | 74/473 R |
| 3,978,739 | 9/1976 | Hobbensiefken et al. | 74/473 R |
| 4,104,929 | 8/1978 | Kessmar | 74/473 R |
| 4,269,282 | 5/1981 | Mencock et al. | 74/473 R |
| 4,270,403 | 6/1981 | West | 74/473 R |
| 4,275,612 | 6/1981 | Silvester | 74/473 R |
| 4,311,064 | 1/1982 | Sukeshita | 74/473 R |
| 4,344,334 | 8/1982 | Schmittbetz et al. | 74/473 R |
| 4,348,915 | 9/1982 | Leitermann et al. | 74/473 R |

*Primary Examiner*—Larry I. Schwartz
*Attorney, Agent, or Firm*—C. H. Grace; H. D. Gordon

[57] ABSTRACT

A remote master shift control mechanism (50) for mechanical shifting of a remotely controlled manual transmission (T) by applying a rotational (24) and an axial (22) motion to a connecting rod (20) operatively connected to the shift shaft (36) of the transmission is provided. The remote master shift control mechanism includes a master shift lever (66) which is attached to a master control shaft (54) by means of a clevis joint (81). The master control shaft is mounted in a control housing (52) for axial movement along and rotational movement about its axis (56) and includes at least one end (58) extending from the housing for operative (112) connection to the connecting rod. The control housing (52) defines a slot (86) extending substantially parallel to the pivot axis (80) of the clevis joint connection in which a bulbulous portion (98) of the shift lever is received and through which the bulbulous portion may travel upon movement of the shift lever in a plane containing the pivot axis (80) to apply a joint rotation to the shift lever and control shaft. The bulbulous portion is engageable with contact surfaces (88, 90) defining the slot (86) to define a reaction pivot point for the lever (66) upon movement of the lever in a plane containing the axis (56) of the control shaft (54) whereby movement of the control lever (66) in a plane containing the axis (56) of the control shaft will impart an axial movement to the control shaft.

8 Claims, 10 Drawing Figures

REMOTE MASTER SHIFT CONTROL

RELATED APPLICATIONS

This application is related to U.S. Pat. applications Ser. Nos. 447,346 filed Dec. 6, 1982 and titled TRANSMISSION SHIFTING MECHANISM; 436,137 filed Oct. 22, 1982 now Pat. Nos. 4,502,346 and titled VARIABLE MECHANICAL ADVANTAGE TORQUE ARM and 562,362 filed Dec. 16, 1983 and titled DIRECTLY MOUNTED MASTER SHIFT CONTROL.

BACKGROUND OF THE INVENTION

1. Field of the Invention

The present invention relates to master control mechanisms for mechanical remote control of manually shifted change gear transmissions. In particular, the present invention relates to remote master shift control mechanisms for shifting a manual change gear transmission which control mechanism is adapted for substantially universal use in vehicles of various configurations.

2. Description of the Prior Art

Remote master shift control mechanisms for shifting manual change gear transmissions are well known in the prior art and examples thereof may be seen by reference to U.S. Pat. Nos. 2,040,594; 4,104,929; 4,269,282; 4,275,612; 4,311,064, and 4,348,915, the disclosures of which are all hereby incorporated by reference.

Typically, such remote master shift control mechanisms are utilized in cab-over-engine type trucks or the like wherein the vehicle operators cab is located remotely from the transmission shift bar housing assembly.

The remotely controlled manually shifted change gear transmissions typically include a shift bar housing assembly comprising a plurality of axially slideable shift rails, each of which carry a shift fork or yoke thereon. A transversely mounted shift shaft is rotatably and axially moveably mounted in the shift bar housing assembly and carries a shift finger fixed thereto. The shift shaft is selectively axially moved in a direction transverse to the axes of the shift rails to align the shift finger with the shift block assembly or notch on a selected shift rail and then the shift shaft is selectively rotated to cause the shift finger to engage the selected shift block assembly to impart a desired axial movement to the selected shift rail and shift fork carried thereby. Remotely controlled transmissions utilizing a remotely controlled slave shift lever pivotably mounted at the transmission are also known in the prior art. Shift bar housing assemblies of various types for remotely controlled transmissions may be seen by reference to U.S Patent Nos. 2,040,595; 3,857,299; 4,104,929; 4,266,438; 4,269,282 and 4,275,612 all of which are hereby incorporated by reference.

Selected rotational and axial movement of the shift shaft, or pivotal movement of a slaved shift lever, is accomplished by means of a control or reach rod, also called a connecting rod, which extends generally transverse to the shift shaft and which may be selectively axially moved and/or rotated about its axis. Typically, a torque arm assembly, crank assembly or similar linkage is pivotably mounted to an end of the control rod, mounted to a reaction member associated with the shift bar housing and fixedly mounted to an end of the shift shaft whereby rotational movement of the control rod will impart an axial movement to the shift shaft and an axial movement of the control rod will impart a rotational movement to the shift shaft. The remote master shift control is typically located in the vehicle operators cab, forward of the transmission, for manual manipulation by the vehicle operator to impart a selected rotational and/or axial movement to the reach rod.

Synchronized mechanical transmissions are also well known in the prior art and may be seen by reference to U.S. Patent Nos. 4,307,624; 3,929,029 and 3,221,851, all of which are hereby incorporated by reference. Typically, such transmissions comprise constantly meshed gears on parallel shafts with synchronized positive clutches to selectively clutch a selected one of the gears for rotation with one of the shafts. Such synchronized positive clutch assemblies usually comprise an axially fixed positive clutch member (usually fixed to a gear) and an axially slideable clutch member (usually splined to a shaft for rotation therewith and axial movement relative thereto) movable toward and away from the fixed positive clutch member. The axially slideable positive clutch member is typically selectively axially moved by one of the shift forks carried by a shift rail. The synchronized clutch assembly includes a pair of friction surfaces defining a friction synchronizer clutch for causing the two positive clutch members to rotate at a synchronous or substantially synchronous speed, which friction surfaces require a relatively large axial force for proper operation in heavy duty transmissions such as are used in heavy duty trucks and the like. Accordingly, in synchronized mechanical transmissions, especially synchronized mechanical transmissions for relatively heavy duty use, the force required to rotate the shift shaft to axially move a selected shift rail is often considerably greater than the force required to axially move the shift shaft to select a desired shift rail.

The prior art remote master shift control mechanisms for mechanically shifting remote manual change gear transmissions, especially heavy duty synchronized transmissions, were not totally satisfactory as the remote master shift control mechanisms were not well suitable for substantially universal use with a large variety of vehicle configurations, were not suited for use in both vehicle configurations requiring the use of a crank mechanism at the master control unit and vehicle configurations allowing the elimination of the crank mechanism at the master control unit, required attachment to the reach or connecting rod in a manner wherein the lever member axially moving and/or rotating the crank mechanism was not perpendicular to the axis of the reach rod which results in undesirable movement of the master shift lever along an oblique path, were not easily adapted to allow variation of the plane of the shift pattern in the operators cab to best utilize the cab configuration and/or maximize convenience to the operator while maintaining the crank operating lever substantially perpendicular to the axis of the reach rod and/or did not provide means at the master control assembly for providing independent mechanical advantage in the rear selection and rear engagement modes of operation.

SUMMARY OF THE INVENTION

In accordance with the present invention, the drawbacks of the prior art have been overcome or minimized by the provision of a remote master shift control mechanism which is well suited for use with a wide variety of vehicle configurations, which is well suited for use in truck configurations allowing elimination of the crank mechanism at the master control as well as those configurations requiring a crank mechanism at the master control, which allows easy adjustment of the link member at the master control attached to the crank mechanism for rotating and axially moving the reach rod to maintain same substantially perpendicular to the reach rod, allows positioning of the master shift lever to selectively move the plane of the shift pattern to best utilize the vehicle cab configuration and/or maximize operator convenience while maintaining a perpendicular relationship between the reach rod and link member at the master control assembly for rotating and/or axially moving the crank mechanism and provides an independent mechanical advantage of the master shift lever for the gear selection and gear engagement modes of operation.

The above is accomplished by providing a remote master control mechanism including a control housing mountable at a location remote from the remotely controlled change gear transmission, such as in the vehicle cab of a cab-over-engine type heavy duty truck. A master control shaft is mounted in the control housing for axial and rotational movement relative to the housing. At least one end of the master control shaft extends outwardly from the housing for operative connection to the connecting or reach rod. A master shift lever extends outwardly from the control housing for manipulation by the vehicle operator and is mounted to the master control shaft by a clevis type joint allowing the master shift lever to pivot relative to the master control shaft in a plane parallel to the axis of the master control shaft while rotationally fixing the master shift lever for rotation with the master control shaft in a plane substantially perpendicular to the axis of the master control shaft. The master control housing is provided with a slot extending substantially perpendicular to the axis of the master control shaft in which a portion of the master shift lever is received whereby pivotal movement of the master shift lever in a direction substantially perpendicular to the axis of the master control shaft will result in joint rotational movement of the master shift lever and master control shaft about the axis of the master control shaft and pivotal movement of the master control lever in a direction substantially parallel to the axis of the master control shaft will result in the master shift lever pivoting about a pivot or reaction point defined by the contacting surfaces of the portion of the master shift lever and slot provided in the control housing, which pivotal movement will result in axial movement of the master shift shaft along its axes. Accordingly, it may be seen that the mechanical advantage of the master shift lever when rotating the master control shaft about its axis is determined in part by the location of the axis of the master control shaft relative to the shift knob of the master shift lever while the mechanical advantage of the master shift lever when axially moving the master control shaft is determined in part by the location of the contacting surfaces of the slot and the portion of the shift lever received therein relative to the control knob of the master shift lever.

The end of the master control shaft extending from the control housing is operatively connectable to the connecting or reach rod for selectively applying an axial and/or a rotational movement thereto. In one embodiment of the invention, an outer crank lever or crank link is fixed to the outer end of the master control shaft for rotational and axial movement therewith which outer crank lever is drivingly received in a crank mechanism of known structure which is in turn operatively attached to the reach rod for imparting an axial and/or rotatioonal movement thereto. The outer crank lever is preferably circumferentially adjustably fixed to the outer end of the master control shaft whereby the outer crank lever may be maintained substantially perpendicular to the axis of the reach rod regardless of positioning of the master control housing relative to the axis of the reach rod. Additionally, the length of the master control rod outer portion may be selectively varied, and/or extensions assembled thereto, allowing the reach rod to be placed at the most advantageous transverse position on the particular vehicle configuration while maintaining the axis of the control shaft perpendicular to the axis of the reach rod. In vehicle configurations wherein a straight uninterrupted path allows the master control mechanism to be transversely aligned on the vehicle with the reach rod, and the reach rod aligned perpendicular to the shift shaft, the remote master control may be rotated 90° such that the master control shaft extends substantially coaxially with the reach rod with the end of the master control shaft extending from the housing connected directly to the reach rod by means of a universal joint or the like and the requirement for a crank mechanism and the undesireably large amount of free play normally associated therewith, may be eliminated.

Accordingly, it is an object of the present invention to provide a new and improved remote master shift control mechanism for a remotely controlled manual change gear transmission.

Another object of the present invention is to provide a new and improved remote master shift control mechanism for controlling a remotely controlled manual change gear transmission which is adaptable for use with a wide variety of vehicle configurations and will maintain a substantially perpendicular relationship between the axes of those linkage members interconnected such that the axial movement and rotational movement, respectively, of a first member is converted into a rotational movement and axial movement, respectively, of the second member.

A further object of the present invention is to provide a new and improved remote master shift control mechanism for shifting a remotely controlled manual transmission wherein the mechanical advantage of the master shift lever for applying a rotational movement to the reach rod is independent of the mechanical advantage of the master shift lever for providing an axial movement to the reach rod.

These and other objects and advantages of the present invention will become apparent from a reading of the description of the preferred embodiments taken in view of the attached drawings.

DETAILED DESCRIPTION OF THE PREFERRED EMBODIMENTS

In the following description of the preferred embodiments, certain terminology will be used for convenience and reference only and are not intended to be limiting. For example, the terms "forward" and "rearward" will refer to directions in the transmission shift control mechanism of the present invention as conventionally mounted in a vehicle. The terms "upward", "downward", "rightward" and "leftward" refer to directions in the drawings to which reference is made. The terms "inward" and "outward" refer to directions toward and away from, respectively, the geometric center of the device being described. The foregoing applies to modifications and derivatives of the terms above specifically mentioned and to terms of similar import.

Figure 1:
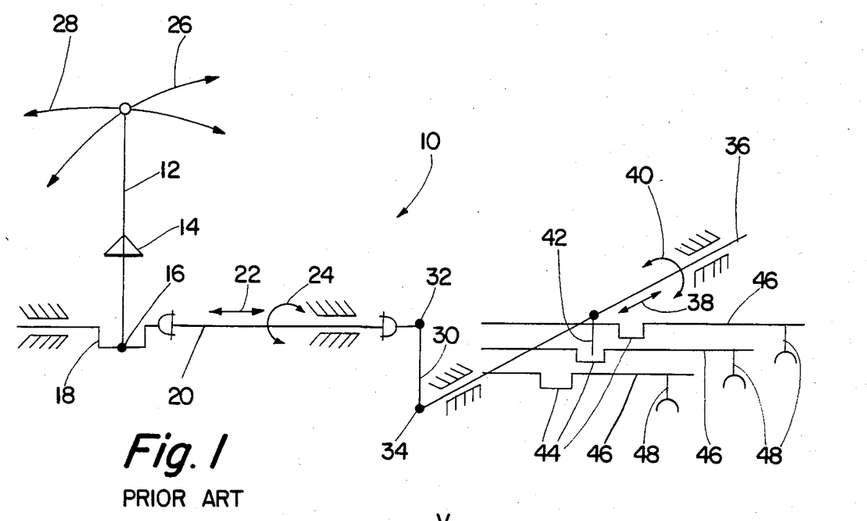
FIG. 1 is a schematic illustration of a typical prior art remote control mechanism for manually shifting a remotely controlled change gear transmission.

Referring to FIG. 1, prior art manually operated remote control system 10 of the type in which the remote master shift control mechanism of the present invention is especially advantageously utilized is illustrated. Remote controls for change gear transmissions are well known in the prior art and are especially advantageously utilized in motor vehicles such as heavy duty trucks of the "cab-over-engine" type which permits locating of the driver seat and the driver cab at the extreme front end of the vehicle, usually on top of the engine, thereby permitting use of the space normally occupied by the cab for loading space. Remote controls of this type may be seen in greater detail by reference to U.S. Patent Nos. 2,040,594; 4,104,929; 4,269,282; 4,275,612; 4,311,064 and 4,348,915 previously mentioned above. Briefly, remote control system 10 comprises a master shift lever 12 which is generally pivotably attached at a tower assembly 14 and which has one end 16 thereof attached to a crank mechanism 18 of a connecting or reach rod 20. Connecting or reach rod 20 is supported in a support member for axial movement along its axis as indicated by arrow 22 and rotation about its axis as indicated by arrow 24 whereby rightward or leftward pivotal movement of the shift lever as indicated by arrow 26 will result in a rotational movement of control rod 20 about its axis and forward and rearward movement of shift lever 12 as indicated by arrow 28 will result in a corresponding opposite axial movement of control rod 20 in the direction of arrow 22. A torque arm 30 is pivotably mounted about a pivot axis transverse to the axis of control rod 20 at one end 32 thereof to the control rod 20 and is fixedly mounted at the other end 34 thereof to a shift shaft 36. Preferably, the reach rod 20 will include at least one universal joint connection therein.

Shift shaft 36 is supported in a shift bar housing assembly of a known type for movement along its axis in the direction of arrow 38 and rotation about an axis in the direction of arrow 40. The axis of shift shaft 36 is generally transverse to and spaced from the axis of control rod 20. Shift shaft 36 carries a shift finger 42 fixed thereto which may be aligned with the shift block members 44 carried by a plurality of generally parallel shift rails 46 extending generally transverse the axis of shift shaft 36. Each of the axially moveable shift rails 46 carries a shift fork 48 fixed thereto as is well known in the art. As may be seen, and is well known in the art, a rotational motion of control rod 20 will result in torque arm 30 pivoting in a plane perpendicular to the axis of control rod 20 and containing the axis of shift shaft 36, whereby an axial movement will be applied to the shift shaft to selectively align shift finger 42 with the shift block 44 of a selected shift rail. This is the gear selection mode of operation of control system 10. An axial movement of control rod 20 will result in torque arm 30 pivoting about the axis of shift shaft 36 in a plane perpendicular to the axis of shift shaft 36 thereby imparting a rotational movement to the shift shaft 36 and shift finger 42 carried thereby to selectively axially move the selected shift rail 46 and shift fork 48 carried thereby. This is the gear engagement mode of operation of remote shift control assembly 10. The specific structure of the remote control shift assembly 10 described above, and known modifications thereof, is illustrated as a matter of example only, rather than of limitation, and is intended to describe an especially suitable environment for the remote master shift control mechanism for the present invention.

In typical remotely controlled shift bar housing mechanisms, see FIG. 1, a rotational motion of reach rod 20 is required for the gear selection mode of operation (i.e. movement of shift shaft 36 along axis 38 thereof) while an axial movement of reach rod 20 is required for the ingear mode of operation (i.e. a rotational motion of shift shaft 36 about its axis). While the remote master control mechanism 50 of the present invention is described in relation to remotely controlled shift bar housing assemblies of this type, it is understood that remotely controlled mechanisms are possible wherein axial movement of the reach rod 20 is utilized for the gear selection mode of operation and rotational motion of each rod 20 is utilized for the gear engagement mode of operation and that the remote control mechanism 50 of the present invention is equally suited for use in connection with such remotely controlled shift bar housing mechanisms.

Multi-speed change gear transmissions utilizing constantly meshed gears which are selectively clutched to a shaft by means of an axially slidable clutch are well known in the prior art and examples thereof may be seen by reference to the above mentioned U.S. Patent Nos. 4,273,004; 3,387,501 and 4,296,642. In such transmissions, the slideable gear or clutch member is provided with a groove in which the shift fork or shift yoke 48 is received for imparting a selective axial movement thereto. The axially slidable clutch mechanisms may be of the non-synchronized or clash type as may be seen be reference to U.S. Pat. 3,105,395, the disclosure of which is hereby incorporated be reference, or may include a blocking or synchronizing mechanism as is also well known in the prior art.

The gear shift lever 12 normally utilized in heavy duty cab-over-engine vehicles projects upwardly from the floor of the drivers compartment or cab, often from between the driver's seat and the engine cover. Accordingly, the space available for lateral pivotal movement 26 is often limited. This can be an especial problem in vehicles utilizing a six forward speed-one reverse speed type transmission which requires the driver to move the shift lever to four different transverse positions to select a desired shift rail. Accordingly, it is desireable to minimize the required transverse travel of the shift lever. For synchronized transmissions, a relatively large force must be provided in forward-rearward movement 28 of the shift lever 12 and thus a large mechanical advantage of the shift lever in this mode of operation is desired. In the prior art systems 10, the design of the shift lever 12 and/or the offset of the crank mechanism was necessarily a compromise between the mechanical advantage/shift lever travel requirements of the transverse 26 and forward-rearward 28 modes of operation of the shift lever.

The remote master shift control mechanism 50 of the present invention, in one configuration thereof, may be seen by reference to FIGS. 2-5. As was the case with the prior art control system 10 described above, the purpose of master remote control mechanism 50 is to impart a selected axial and/or rotational movement to connecting or reach rod 20. Remote master control mechanism 50 includes a master control housing 52 which is mountable in the vehicle operator cab at a position convenient for the operator. A master control shaft 54 is mounted in the housing 52 for rotational movement about and axial movement along its rotational axis 56. The righthand end 58 of master control shaft 54 extends from the control housing 52 for operative connection to the connecting or reach rod 20 as will be described in greater detail below. In the illustrated embodiment of FIG. 2, the lefthand end 60 of control shaft 54 also extends from the housing 52 allowing the control mechanism 50 to be utilized with various vehicle configurations. A cap member 62 may be utilized to seal the housing 52 and protect the end 60 of the control shaft not operatively connected to the reach rod 20. Preferably, antifriction bushings 64 are utilized to slideably and rotationally support the control shaft 54 in the housing 52. A master shift lever 66 extends upwardly from the control housing 52 to a shift knob 68, T-handle or the like for manual manipulation by the vehicle operator.

Figure 2:
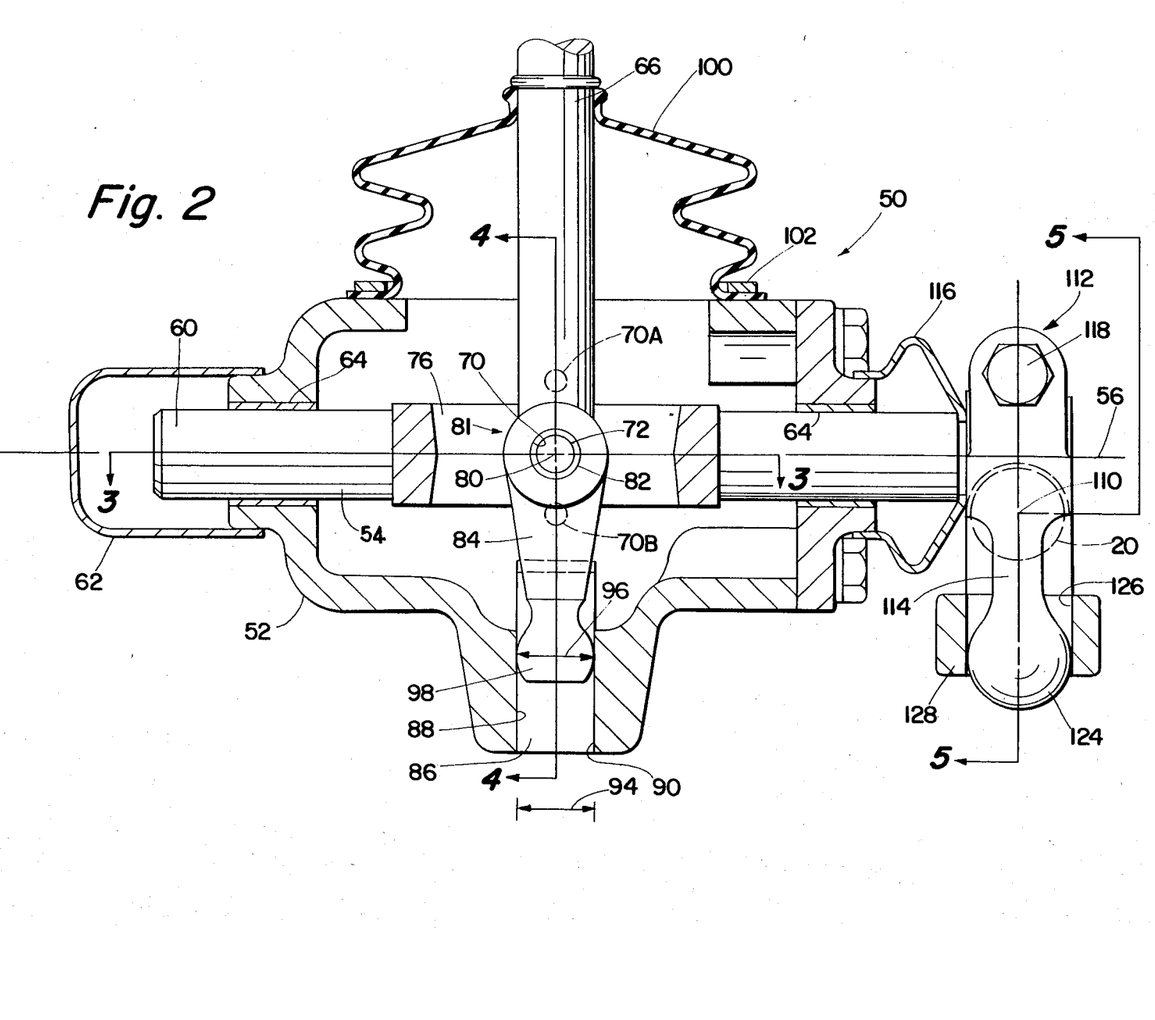
FIG. 2 is a front elevational view, partially in section, of one embodiment of the remote master shift control mechanism of the present invention.
Figure 3:
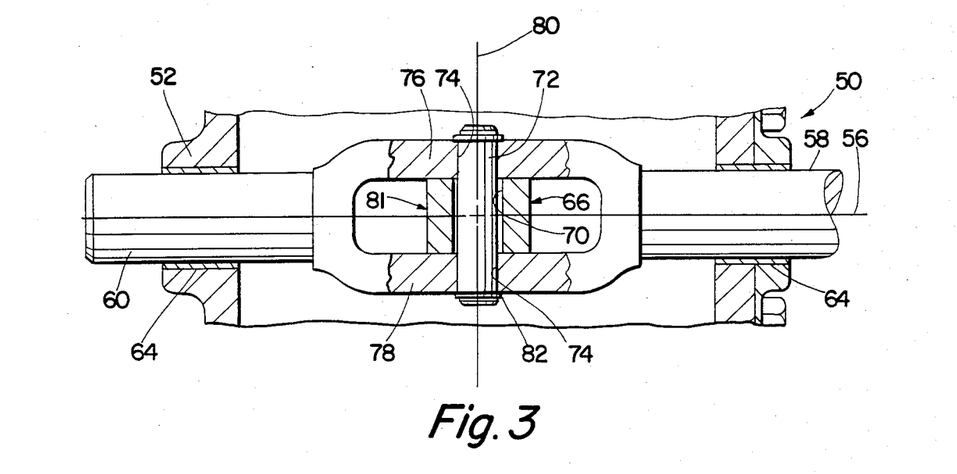
FIG. 3 is a partial top view, partially in section, taken along the lines 3—3 in FIG. 2.
Figure 4:
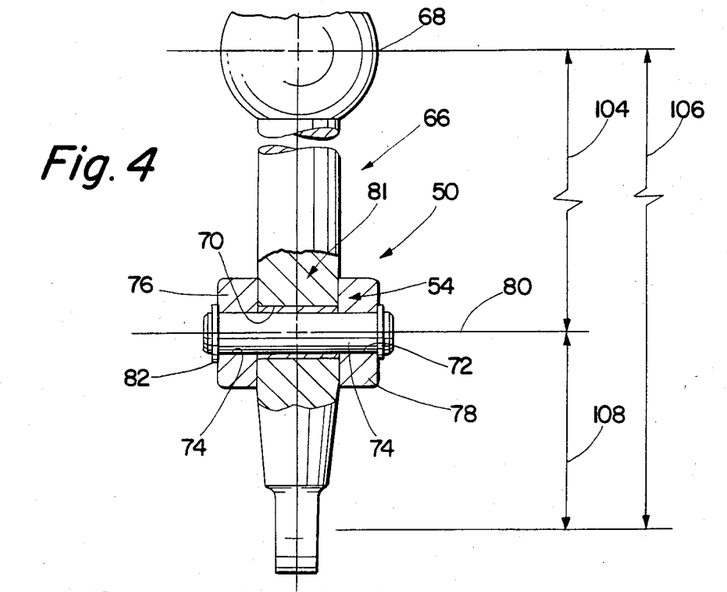
FIG. 4 is a partial side view, partially in section, taken along the lines 4—4 in FIG. 2.

The master shift lever 66 is provided with a through bore 70 extending generally perpendicularly to the axis 56 of shift control shaft 54 in which is received a pivot pin 72 which is also pivotably received in a pair of bores 74, provided in the split leg members 76 and 78 of the shift control shaft 54 and extending along an axis 80 perpendicular to axis 56. Accordingly, the master shift lever 66 is attached to the shift control shaft 54 at a clevis type connection 81 defined by the pivot pin 72 and the bores 70 and 74 in which the pivot pin is received, which clevis type joint will fix the master shift lever 66 and master control shaft 54 for joint rotation about axis 56 as the result of pivotal movement of the master shift lever 66 on a plane containing axis 80 and will allow master shift lever 66 to pivot about axis 80 relative to the control shaft 54 upon movement of the master shift lever 66 in a plane containing axis 56. Snap rings 82, or the like, may be utilized to removably retain the pivot pin 72 in bores 70 and 74.

The master shift lever 66 extends downwardly from pivot axis 80 to define a fulcrum portion 84 which is slideably received in a slot 86 which extends substantially parallel to axis 80. Slot 86 is defined by two opposed fulcrum contact surfaces 88 and 90 in the lower portion 92 of housing 52, which surfaces are spaced apart by a distance 94 generally equal to the transverse dimension 96 of the bulbulous tip 98 lever portion 84. Accordingly, movement of the master shift lever 66 on a plane containing axis 80 will result in the shift lever fulcrum portion 84 sliding through slog 86 and joint rotation of lever 66 and control shaft 54 about axis 56. Movement of master shift lever 66 in a plane containing the axis 56 will result in the bulbulous end 98 of shift lever fulcrum portion 84 contacting one of the two contact surfaces, 88 or 90, of slot 86 to define a pivot or reaction point for lever 66 which will result in axial movement of control shaft 54 along its axis 56. As may be seen by reference to FIG. 2, the transverse surfaces of bulbulous portion 98 are preferably of an arcuate shape to provide a rolling contact thereof with contact surfaces 88 and 90 defining slot 86. A flexible boot structure 100 attached to housing 52 by fasteners 102 is utilized to seal the upper portion of the remote master shift control mechanism 10. Of course, the bottom of slot 86 may be closed to seal housing 52.

Movement of the master shift lever 66 on a plane containing axis 56 of control shaft 54 will result in an axial movement of control shaft 54 along is axis 56. Movement of master control lever 66 on a plane containing axis 80 of the clevis joint pivot pin 72 will result in a rotational movement of control shaft 54 and lever 66 about axis 56. During such movement, the lower portion 84 of master shift lever 66 will move through slot 86. Preferably, both the right and lefthand ends, 58 and 60, of shift control shaft 54 extend from housing 52 and thus either of the ends may be operatively connected to reach rod 20 allowing great flexiblility in the transverse placement of the remote master shift control mechanism 50 on a vehicle.

The mechanical advantage of master control lever 66 when moved in a plane containing axis 80 to provide a rotational motion to control shaft 54 is defined, in part, by the torque arm length 104 between shift knob 68 and axis 56. The mechanical advantage of master shift lever 66 for movement in a plane containing the axis 56 of control shaft 54 to provide an axial movement to control shaft 54 is defined, inpart, by the relationship between the distance 106 between the shift knob 68 and the pivot or reaction point defined by the contacting surfaces of bulbulous portion 98 and surfaces 88 and 90 of slot 86 relative to the distance 108 between the pivot or reaction point and the clevis axis 80. Accordingly, the mechanical advantage, and the required arcuate travel of knob 68 to achieve a given rotational movement or an axial movement of control shaft 54 are independent and may be designed to optimize a particular installation/transmission requirement. For example, the lower fulcrum portion 84 of master shift lever 66 may be of a greater length than illustrated and for this purpose relatively deep contact surfaces 88 and 90 are provided, or alternate bores 70a and 70b (see (FIG. 2) may be provided in lever 66 for receipt of the pivot pin 72. by way of example, if the remote master shift control mechanism 50 is to be utilized with a synchronized change gear remotely controlled transmission, it is desired to provide a greater mechanical advantage in the gear engagement mode of operation than in the gear selection mode operation as a considerable axial force is required to apply the frictional synchronizing clutches, as is well known in the prior art, while a relatively small force is required to axially move the shift shaft 36 in the gear selection mode of operation. By providing a remote master control assembly wherein the mechanical advantage in each of the modes of operation is independent, an optimal combination of mechanical advantage/shift lever travel for each of the modes of operation may be designed separately.

Additionally, for the configuration illustrated in FIG. 2, the mechanical advantage of the shifting mechanism is defined, in part, by the length of external lever 114 and the offset of the crank mechanism 130, both of which are external of housing 52 for attachment to one of the external ends, 58 or 60, of master control shaft 54. Accordingly, these parameters may be varied without varying the structure of master shifting mechanism 50 as contained within the housing 52.

Figure 5:
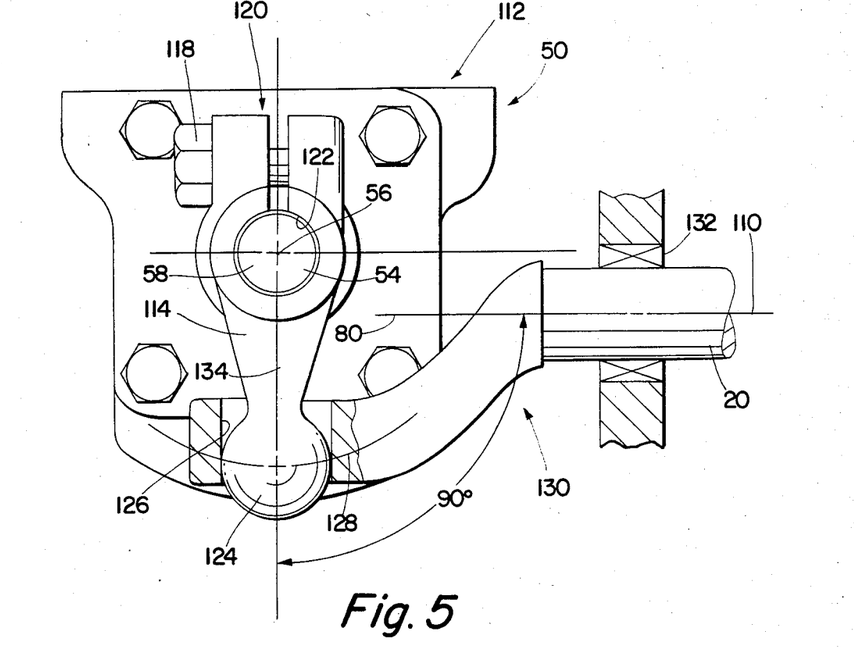
FIG. 5 is a side view of the remote master shift control mechanism of FIG. 2 taken substantially along lines 5—5 in FIG. 2.

In most vehicle configurations requiring the utilization of a remote master shift control mechanism, the location of the vehicle engine E, clutch C, remotely controlled change gear transmission T and other vehicle structures within the vehicle frame rails R do not permit placement of the remote master control such that axis 56 of the shift control shaft 54 can be substantially coaxial with the axis 110 of reach rod 20 while maintaining axis 110 substantial perpendicular to axis 38 of shift shaft 36. Accordingly, as may be seen by reference to FIG. 7, to maintain the desired coaxial and/or perpendicular relationship between the various linkage or shaft members, the control shaft 54 must be operatively connected to the reach rod 20 by means of a crank mechanism indicated generally at 112. The configuration of remote master shift control mechanism 50 illustrated in FIGS. 2 and 5 illustrates the structure of such a typical crank mechanism.

Crank mechanism 112 includes a crank lever 114 which is fixed to one of the outer ends, 58 or 60, of master control shaft 54 for rotational and axial movement therewith. The crank lever 114 is fixed to the lever end 58 at a point exterior to control housing 52 and a boot structure 116 is utilized to seal the housing 52 thereat. It is important to note, as will be described in greater detail below, that the attachment of crank lever 114 to shift control shaft 54 is adjustable as to both relative axial and circumferential positioning. In the embodiment illustrated, a bolt 118 is utilized to provide an adjustable clamping connection 120 between the crank lever 114 and the shift control shaft 54. Clamping connection 120 may be a simple clamp connection between a relatively smooth outer surface of end 58 of shaft 54 as is illustrated for infinite rotational adjustment therebetween or shaft end 58 and the interior clamping bore 122 of lever 114 may be provided with interacting splines or the like for more positive but incremental adjustment. As may be seen, crank lever 114 terminates at a spherical or bulbulous end 120, which is received within a bore 126 of the offset portion 128 of the crank connector 130. As is known in the art, reach rod 20 is typically supported, as by bearing 132, for rotational movement about and axial movement along its axis 110. Accordingly, rotational movement of control shaft 54 about axis 56 will result in a pivotal movement of crank lever 114 about axis 56 causing spherical end 124 to move in an arcuate path resulting in a corresponding axial movement of reach rod 20 along its axis 110. Axial movement of shift control shaft 54 along its axis 56 will result in a corresponding axial movement of crank lever 114 which will impart a rotational movement, through the offset crank, to reach rod 20 about its axis 110. It is understood, of course, that crank mechanisms for connecting a reach rod to a master shift lever are well known in the prior art and that various modifications of crank mechanism 112 are possible within the scope of the present invention.

Figures 8, 9, 10:
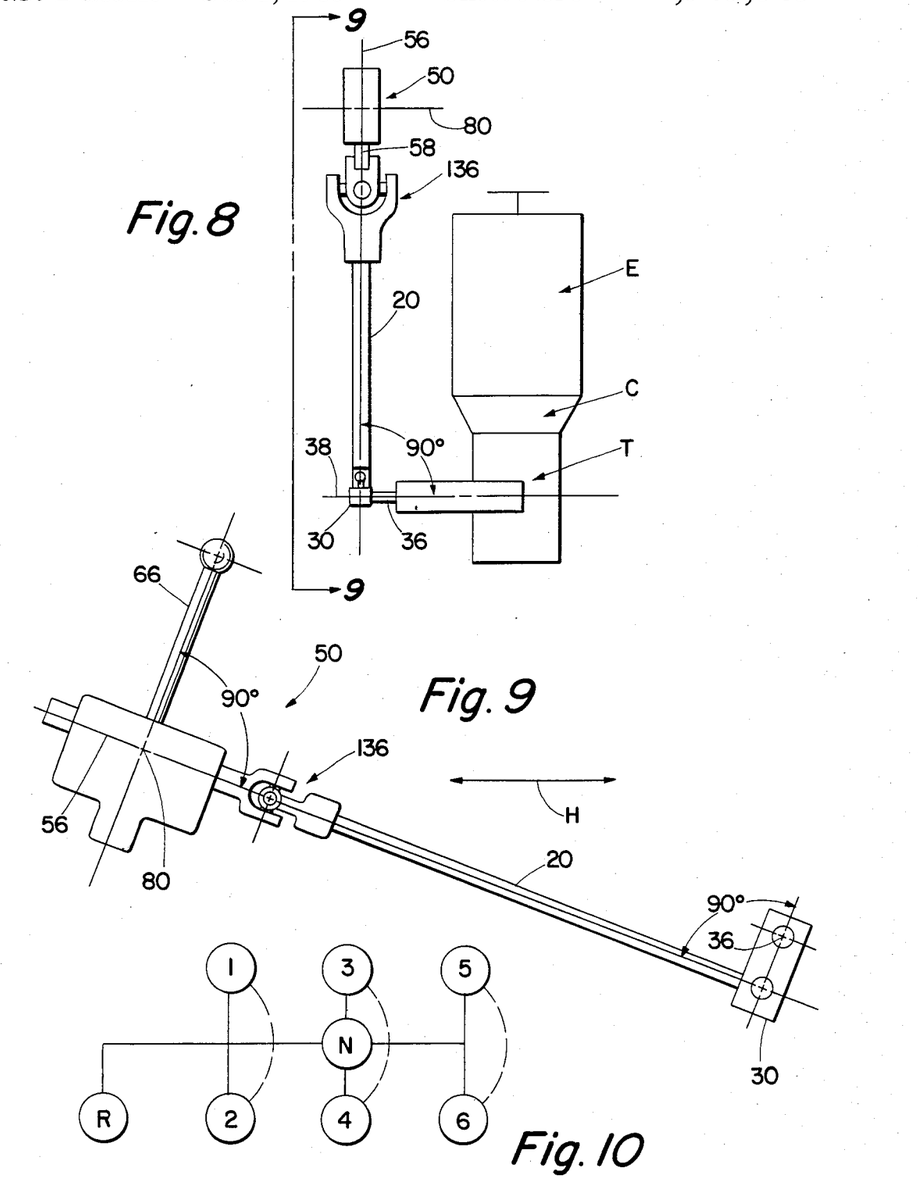
FIG. 8 is a top schematic view of an alternate embodiment of the remote master shift control mechanism of the present invention as utilized in an alternate vehicle configuration.
FIG. 9 is a schematic view taken substantially along lines 9—9 in FIG. 8.
FIG. 10 is a schematic illustration of the shift pattern in the present invention.

The shift pattern for remote master shift control mechanism 50 as utilized to remotely control a six forward speed, single reverse speed change gear transmission is illustrated schematically in FIG. 10. As is known, to preserve the most efficient form of shifting, that is to avoid the requirement for oblique shift lever movement as illustrated in the dotted lines in FIG. 10, which shift lever motion is often objectionable as it requires greater driver effort, requires additional space in the vehicle cab and does not provide a true feel of gear engagement, it is necessary to preserve a substantially right angle relationship between the axes of those control members wherein rotational and axial movement of one of the control members is converted into axial and rotational, respectively, motion of the other control members. This preferred relationship between the axis 134 of crank lever 114, i.e. a line drawn from axis 56 through the spherical end 124, and axes 110 of reach rod 20 is illustrated in FIG. 5.

Several of the advantages obtainable by the utilization of a remote master shift control assembly 50 which, without the requirement of a crank mechanism, converts operator movement of the master shift lever 66 into rotational or axial movement of a shift control shaft 54, the ends of which shaft extend from the control housing 52, will be described in detail below.

Figure 6:
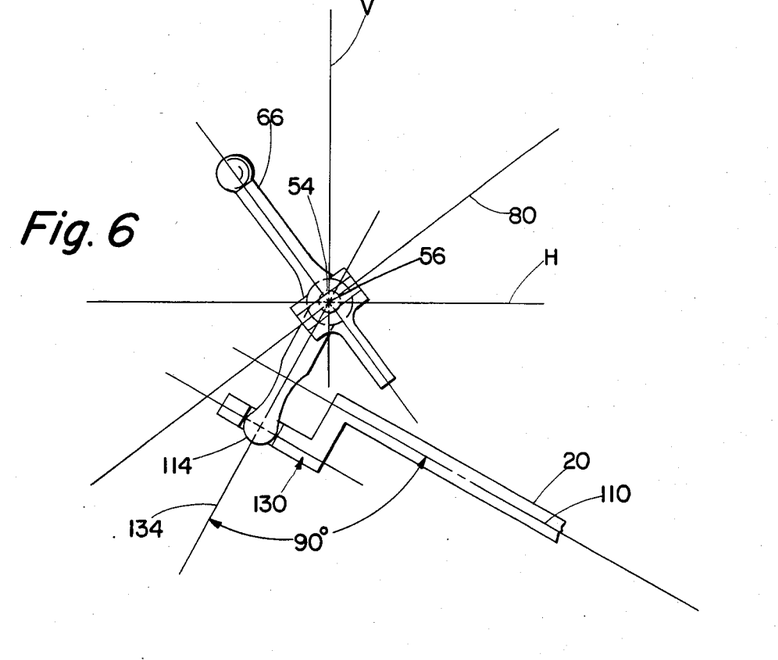
FIG. 6 is a schematic illustration of the remote master shift control mechanism of FIG. 2 in an alternate configuration thereof.

Referring now to FIG. 6, it may be seen that in cab-over-engine type vehicles it is often necessary that the center line 110 of the reach rod 20 be at a considerable incline relative to the horizontal direction H. By simply adjusting the relative rotational positioning between crank lever 114 and shift control shaft 54, by means of the clamp connector 120, the desired right angle relationship between the axis 134 of crank lever 114 and the axis 110 of reach rod 20 may be maintained. Additionally, by utilizing the connection 120, the entire housing 52 may be rotated as desired to position the plane of the shift pattern, defined as a plane containing axes 56 and 80, at any angle relative to the vertical and horizontal directions to best suit the available vehicle configuration and/or best suit operator convenience. It is noted that repositioning of the plane of the shift pattern is possible while maintaining the desired right angle relationship between crank lever 114 and reach rod 20 and thus preserving the desired straight line shift pattern.

Figure 7:
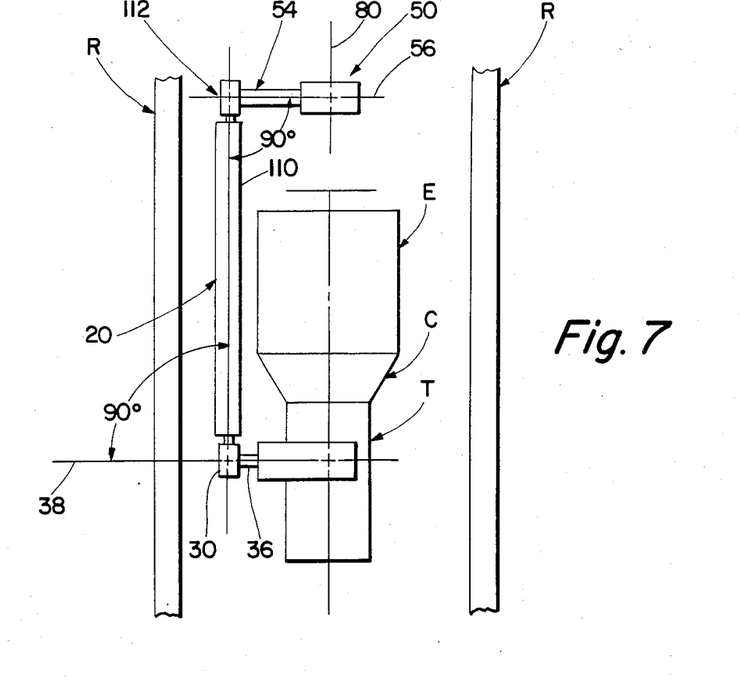
FIG. 7 is a top schematic illustration of the installation of the remote master shift control mechanism of the present invention in a typical cab-over-engine type vehicle.

Referring now to FIG. 7, it may be seen that by simply varying the length of shift control shaft 54, or the axial position at which crank lever 114 is attached to shaft 54, the remote master shift control mechanism 50 may be positioned at any convenient transverse location in the vehicle while preserving the desired right angle relationship between axis 110 of reach rod 20 and axis 56 of master control shaft 54 and of axis 56 and axis 38 of shift shaft 36. Additionally, as the crank mechanism 112 may be attached to the right or lefthand ends, 58 or 60, of the control shaft 54, the remote master shift mechanism 50 is suitable for various configuration including utilization in vehicles having both right and lefthand operator positioning relative to the vehicle.

Although it is not typically feasible, in certain vehicle configurations, it is possible to align the remote master control mechanism 50 transversely in the vehicle with the axis 110 of the reach rod 20 and the axis of the reach rod perpendicularly with the axis 38 of the shift shaft 36. As may be seen by reference to FIGS. 8 and 9, for such situations, the remote control mechanism 50 of the present invention may be used to particular advantage. By rotating the control mechanism 50, 90° from the position illustrated in FIGS. 2–5, thereby aligning axis 56 generally coaxially with axis 110 of the reach rod 20, transverse movement of the shift lever 66 will result in rotational movement of the shift control shaft 54 and forward and reverse movement of the shift lever 66 will result in axial movement of the shift control shaft 54. By attaching the end 58 of the control shaft 54 directly and coaxially with the reach rod 20, as by means of a universal joint 136 or the like, such rotational and axial movement may be transferred directly from the control shaft 54 to reach rod 20 without the necessity of a crank mechanism. It is well known that crank mechanisms, while widely used for remote control of transmissions, are not totally desirable in view of the excessive free play associated therewith which often results in the requirement of excessive movement and/or force to accomplish a given movement and/or a loss of feel to the operator. As is known, the use of U-joint 136 allows shaft 54 and rod 20 to be joined for joint rotational and axial movement while allowing a limited degree of misalignment therebetween.

Accordingly, it may be seen that the remote master shift control mechanism 50 of the present invention converts movement of the master shift lever 66 in transverse directions into rotational or axial movement of a control shaft 54, which control shaft 54 extends from opposite ends of the master control housing 52, and each of which shift lever 66 motions may be designed to provide a mechanical advantage independent of the other motion. As the output of the control mechanism is the axial and rotational motion of a shaft, a wide variety of operative connections to the reach rod 20 extending to the remotely control transmission are possible permitting the master control to be advantageously utilized with a wide variety of vehicle configurations.

It is understood that various changes in the details and arrangements of the components of the above described embodiments may be resorted to without departing of the spirit and the scope of the invention as hereinafter claimed.

I claim:

1. A remote master shift control mechanism for mechanically shifting a remotely controlled change gear transmission by applying a selected rotational and axial movement to a connecting rod operatively connected to the remotely controlled shifting mechanism of the transmission, said master control mechanism characterized by:
    a control housing adapted to be mounted remote from the transmission;
    a master control shaft mounted in said housing for axial movement along and rotational movement about its axis relative to the housing, at least one end of said master control shaft extending from said housing for operative driving connection to said connecting rod;
    a master shift lever extending from said housing and terminating at a free end for manipulation by an operator, said master shift lever attached to said master control shaft at a clevis joint fixing said lever and said shaft for joint rotation about the axis of said control shaft and permitting pivotal movement of said control lever relative to said control shaft about a pivot axis intersection and substantially perpendicular to the axis of said control shaft, said clevis joint defined by a pivot pin received in a first bore provided in said control shaft and in a second bore provided in said master shift lever, said first and second bores being coaxial and extending substantially perpendicular to the axis of said master control shaft;
    said housing defining a pair of opposed contact surfaces extending substantially parallel to said pivot axis to define a slot therebetween in which a portion of said master shift lever is received, said portion of said master shift lever received in said slot extending in the opposite direction from said pivot pin as does the portion for said shift lever extending from said housing for manipulation by said operator and having a transverse dimension measured in the direction of the axis of said master control shaft generally equal to the width of said slot measured in the direction parallel to the axis of said control shaft whereby movement of said master shift lever in a plane containing said pivot axis will result in said portion moving through said slot and said shift lever and control shaft rotating as a unit about the axis of said control shaft and movement of said control lever in a plane containing the axis of said control shaft will result in said portion of said shift lever contacting one of said opposed surfaces to define a reaction point about which said control lever is pivotably moveable and said control shaft will move axially along its axis with said shift lever.

2. The remote master shift control mechanism of claim 1 wherein said portion of said shift lever received in said slot is provided with generally arcuate surfaces for contact with said contact surfaces defining said slot.

3. The remote master shift control mechanism of claim 1, wherein the force required at the manipulation end of said master shift lever to apply a given torque to said master control shaft is a function of the separation of said manipulation end and said axis of said master control shaft and the force required at the manipulation end of said control lever to apply a given axial force to said master control shaft is a function of the separation of said manipulation end and the point of contact of said portion with said one of said contact surfaces and the separation of said pivot axis from said contact point of said portion with said one of said contact surfaces.

4. The remote master shift control mechanism of claim 1 wherein said master control shaft is operatively drivingly connected to said connecting rod by means of a crank assembly including a crank lever adjustably fixed to said one end of said master control shaft for rotational and axial movement therewith at a point exterior of said housing, said crank lever rotationally adjustably positioned on said master control shaft to maintain the axis of said crank lever substantially perpendicular to the axis of said connecting rod.

5. The remote master shift control mechanism of claim 4, wherein said crank lever is adjustably axially positionable upon said one end of said master control shaft.

6. The remote master shift control mechanism of claim 1, wherein said master control shaft is mounted substantially coaxially with said axes of said connecting member by means of a universal joint mechanism.

7. The remote master shift control mechanism of claim 1, wherein the axes of said master control shaft extends substantially perpendicularly to the axis of said connecting rod.

8. The mechanism of claim 3 wherein said master shift lever is provided with a plurality of first bores at different axial distances from said knob end.

* * * * *